MODULATOR CIRCUIT ARRANGEMENT COMPRISING TRANSISTORS

Filed Dec. 1, 1953

INVENTOR.
J. M. Cluwen
BY Frank R. Jeifari
AGENT

United States Patent Office 2,870,413

Patented Jan. 20, 1959

2,870,413

MODULATOR CIRCUIT ARRANGEMENT COMPRISING TRANSISTORS

Johannes Meyer Cluwen, Eindhoven, Netherlands, assignor, by mesne assignments, to North American Philips Company, Inc., New York, N. Y., a corporation of Delaware Application December 1, 1953, Serial No. 395,545

Claims priority, application Netherlands December 1, 1952

10 Claims. (Cl. 332—31)

This invention relates to a circuit arrangement for intermodulating electrical signals from two sources by means of a transistor. For this purpose it is known to make the two signals jointly operative in the circuit between the emitter electrode and the base electrode of the transistor, but this has the disadvantage of causing invariably mutual reaction of one signal source on the other.

The invention has for its object to provide a modulator circuit arrangement, in which at least reaction of one of the two signal oscillations on the other is avoided. The invention is characterized by a transistor comprising at least three input electrodes and one output electrode, one signal source being provided in the circuit of at least one of the input electrodes and the signal from the other source being supplied in counterphase to two of the input electrodes with such an amplitude ratio that at least the current from the last-mentioned signal source, which current passes through the first-mentioned signal source, is practically zero.

In order that the invention may be readily carried into effect, it will now be described in detail with reference to the accompanying drawing, given by way of example, in which.

Figures 1, 2, 3, 4, 5, 6, 7, 8:
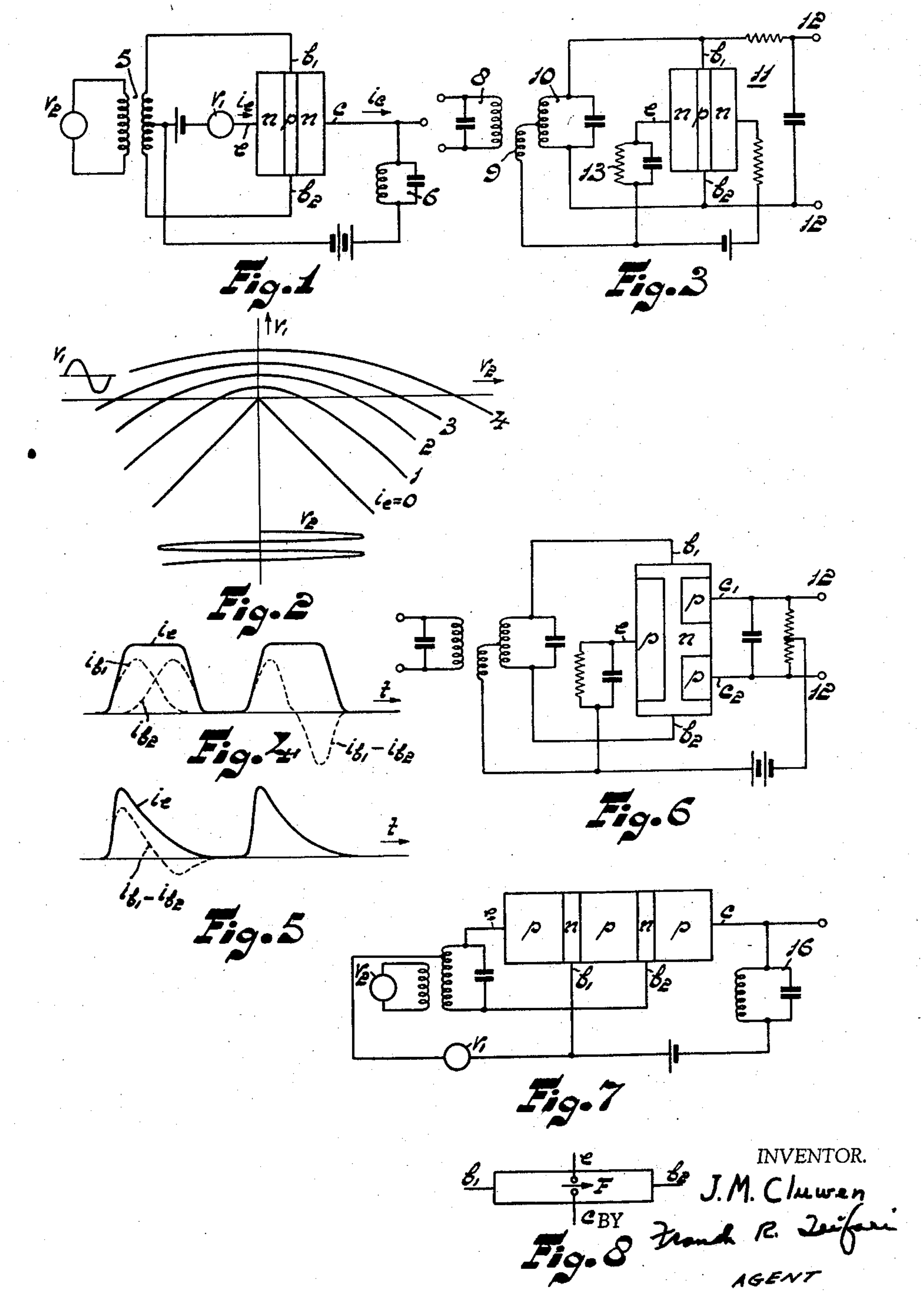
Fig. 1 shows a transistor push-pull modulator circuit according to the invention.
Fig. 2 shows characteristic curves for explaining the operation of the circuit shown in Fig. 1.
Fig. 3 shows a mixing detector circuit arrangement according to the invention for demodulating a frequency-modulated signal.
Figs. 4 and 5 show current-time diagrams for explaining the operation of the circuit arrangement shown in Fig. 3.
Fig. 6 represents an improved circuit arrangement with respect to that shown in Fig. 3.
Fig. 7 is a variant of the transistor modulator shown in Fig. 1.
Fig. 8 shows a variant of a transistor element for use in the circuit arrangement shown in Fig. 1 or 3.

The transistor shown in Fig. 1 is a junction transistor with zones *n* and *p* of opposite conductivity type and comprising an emitter electrode *e*, two base electrodes $b_1$ and $b_2$ which permit of producing a potential gradient parallel to the *n-p* transition, and a collector electrode *c*. The base electrodes $b_1$ and $b_2$ are connected to one and the same *p*-zone whose thickness is smaller than that of the characteristic diffusion zone of the minority charge carriers, in this zone, and the emitter *e* and the collector *c* are connected to two different *n*-zones adjoining said *p*-zone, thus obtaining transistor action both between the electrodes $e—b_1—c$ and between the electrodes $e—b_2—c$. Consequently, the electrodes *e*, $b_1$ and $b_2$ act as input electrodes, the electrode *c* acting as an output electrode.

The circuit of the emitter *e* comprises a signal source $V_1$, and the signal from a source $V_2$ is supplied, via a push-pull transformer 5, in counterphase to the two base electrodes $b_1$ and $b_2$, respectively.

In this manner a mixing oscillation of the input signals $V_1$ and $V_2$ is produced across the output impedance 6 which is selective with respect to a mixing product and included in the collector circuit. In the case of the transformer 5 being properly balanced, however, the circuit comprising the signal source $V_1$ will not be traversed by current from the signal source $V_2$ and, conversely, the signal source $V_2$ will not be traversed by current from the signal source $V_1$. In the present case the term "current" is to be understood to mean the current component with the fundamental frequency of the signal source concerned since, of course, the modulation products do pass through both sources.

Fig. 2 shows characteristic curves for those values of the voltages $V_1$ and $V_2$ at which a constant emission current $i_e$ flows to the emitter *e*. Since the currents to the base electrodes $b_1$ and $b_2$ respectively are only a fraction of the emission current $i_e$, the same curves practically also hold for the voltages $V_1$ and $V_2$ at which there flows a constant collector current $i_c$ from the collector *c*.

Upon variation of the voltage $V_1$ with a frequency $f_1$ and that of the voltage $V_2$ with a frequency $f_2$, the emission currents and the collector currents comprise a modulation product with a frequency $f_1 \pm 2f_2$, whereas the current through the secondary winding of the transformer 5 contains a modulation product with a frequency $f_1 \pm f_2$. If, for example, the signal $V_1$ is taken via selective means from the receiving antenna of a radio-receiver, whereas the signal $V_2$ is supplied from a local source of oscillations, a mixing oscillation $f_1 - 2f_2$ is obtainable in the aforesaid manner across the output impedances without undue reaction of the local oscillation on the antenna.

Fig. 3 shows a variant of the circuit arrangement represented in Fig. 1 for frequency-demodulation of an electrical signal. This signal is supplied to a circuit 8 tuned to the central frequency thereof, which circuit is closely coupled to a self-inductance 9 and approximately critically coupled to a similar circuit 10. The voltage across the inductance 9 now functions as the signal $V_1$, the voltage across the circuit 10 acting as the signal $V_2$ in Fig. 1. The first-mentioned voltage is again supplied to the emitter *e* and the last-mentioned voltage is supplied in counterphase to the two base electrodes $b_1$ and $b_2$ respectively. By inter-modulation of these two signals there is set up between the two base electrodes $b_1$ and $b_2$ a potential difference which is substantially proportional to the frequency sweep of the signal across the circuit 8 and is supplied via an intermediate frequency smoothing filter 11 to output electrodes 12.

In order to suppress the influence of any amplitude modulation of the signal across the circuit 8 on the output oscillation at the terminals 12, the circuit connecting the inductance 9 to the emitter *e* comprises an impedance 13 having a comparatively high impedance value with respect to the amplitude-modulation frequencies to be suppressed, but a comparatively low impedance value with respect to the signal frequencies.

The operation of this circuit arrangement will be explained more fully with reference to Figs. 4 and 5. The voltages across the inductance 9 and across the circuit 10 are phase-displaced by 90° with respect to the central frequency of the signal across the circuit 8. The currents $i_e$, $i_{b1}$ and $i_{b2}$ then vary with the time *t* as shown in Fig. 4 on different scales by the curves concerned, so that the direct current component of the current $i_{b1}—i_{b2}$, which flows from one base $b_1$ to the other base $b_2$ is zero. In the case of a phase difference smaller than 90° between the signals across the inductance 9 and the circuit 10, the picture of the current changes into that shown in Fig. 5, where the current $i_{b1}$—$i_{b2}$ contains a positive direct current component corresponding to a positive voltage across the terminals 12. Similarly, a coresponding negative potential is produced across the terminals 12 in the case of a phase-sweep in excess of 90° between said signals. This potential is consequently a measure of the phase angle between said signals and hence of the frequency sweep of the input signal across the circuit 8.

On the other hand the D. C. component of the current $i_e$ is a measure of the signal amplitude across the circuit 8 so that by stabilizing this current by means of the filter 13 the output voltage across the terminals 12 becomes practically independent of variations of this signal amplitude.

Mutual reaction of the signal oscillations via the inductance 9 and the circuit 10 respectively would produce an asymmetrical demodulation curve, hence undue distortion. This reaction is avoided by providing that the current component having the frequency of the signal through the circuit 10 and the inductance 9 respectively in the circuit of the inductance 9 and the circuit 10 respectively is zero with the omission of said inductance 9 and circuit 10 respectively.

Fig. 6 is a variant of the circuit arrangement shown in Fig. 3, wherein the transistor element comprises, besides said emitter $e$ and the two base electrodes $b_1$ and $b_2$, two collectors $c_1$ and $c_2$ associated with separate $p$-zones, so that an amplified demodulated oscillation is produced at the output electrodes 12 after intermediate-frequency smoothing of the oscillation at said collector electrodes $c_1$ and $c_2$.

Fig. 7 shows a further modulation circuit-arrangement, in which the transistor element comprises a mass $p$ of one conductivity type, interrupted by two thin zones $n$ of opposite conductivity type, the thickness of the zones $n$ again being smaller than the characteristic diffusion length of the charge carriers present in a minority in the $n$-zones. One signal $V_1$, for example from a receiving antenna, is supplied to the emitter $e$ connected to one of the $p$-zones of the transistor, and the other signal $V_2$, for example a locally produced oscillation, is supplied in counterphase to said emitter $e$ and the base $b_2$ associated with the second $n$-zone respectively, and this with such a different amplitude that the circuit of the source $V_1$ is not traversed by current from the signal source $V_2$, thus avoiding reaction of the source $V_2$ on the source $V_1$. In this case, for example an oscillation with the difference frequency of the signals $V_1$ and $V_2$ is produced across a selective output impedance 16 included in the collector circuit.

Instead of using the junction type transistors shown in the drawing, it is alternatively possible to use in a similar manner point-contact type transistors comprising a plurality of base electrodes.

Fig. 8 is a plan view of such a transistor. The two ends of the transistor crystal are connected to the two base electrodes $b_1$ and $b_2$ and on top of the crystal are placed an emitter and a collector $e$ and $c$ respectively with the required close relative spacing, preferably in such a manner that the line connecting the contact points of the electrodes $e$ and $c$ extends substantially at right angles to the direction of electrical field strength F which is produced in the proximity of the electrodes $e$ and $c$ upon setting up a potential difference between the electrodes $b_1$ and $b_2$. Such a transistor element may be employed in the circuit arrangements shown in Fig. 1 or 3, the aforesaid positioning facilitating symmetrical control.

What is claimed is:

1. A circuit-arrangement for intermodulating two electrical signals comprising a transistor provided with an emitter input electrode, two base input electrodes and a collector output electrode, a first signal source including push-pull inductive means to derive two signal components in phase opposition therefrom, means to apply said components respectively to two of said input electrodes, a second signal source, means to apply the signal from said second source to the remaining one of said input electrodes, the amplitude of said two signal components having a ratio value at which the current from the first source which passes through the second source is approximately zero.

2. A circuit-arrangement, as set forth in claim 1, wherein said transistor includes three different zones and said three input electrodes are constituted by an emitter electrode connected to one of said zones and two symmetrical base electrodes connected to the second of said zones, said second signal source being connected to the emitter electrode, and wherein said first signal source and means to apply said two components include a push-pull arrangement connected to said base electrodes.

3. A circuit-arrangement, as set forth in claim 2, for frequency-demodulation of an electrical signal further including means for deriving said first and second signal sources from said electrical signal, the signals from said two sources having a relative phase difference varying with the frequency of said electrical signal at which the potential difference between said two base electrodes is a measure of said frequency.

4. A circuit-arrangement, as set forth in claim 3, wherein said transistor includes two separated collector electrodes, the voltage produced between said collector electrodes corresponding to the frequency of the frequency-demodulated signal.

5. A circuit-arrangement, as set forth in claim 1, wherein said transistor comprises a plurality of successive zones of alternately opposite conductivity type and wherein said three input electrodes are constituted by an emitter electrode connected to the first of said zones, a first base electrode connected to the second of said zones and a second base electrode connected to the fourth of said zones, said second signal source being connected between said emitter electrode and said first base electrode, and said first signal source having a signal in counterphase and with different amplitude being connected between said emitter electrode and said second base electrode.

6. A circuit-arrangement, as set forth in claim 1, wherein said transistor comprises a transistor crystal, two base contact points, an emitter contact point and a collector contact point, said points engaging said crystal at positions at which a line connecting said emitter and collector contact points extends substantially at right angles to the direction of the electrical field strength which is produced in the proximity of said emitter and collector points when a potential difference exists between said two base contact points.

7. A circuit-arrangement for intermodulating two electrical signals comprising a transistor having in succession a first zone having the one conductivity type, a second zone having the other conductivity type and a third zone having said first mentioned conductivity type, an emitter electrode connected to said first zone, two symmetrical base electrodes connected to said second zone, and a collector electrode connected to said third zone, a push-pull transformer having a primary winding and a secondary winding having a tap centrally located thereon, said secondary winding being connected between said two base electrodes, a first direct voltage source, a first signal source connected in series with said first voltage source between said tap and said emitter electrode, a second signal source connected across said primary winding, a second direct voltage source, and an output impedance connected in series with said second direct voltage source between said collector electrode and said tap.

8. A circuit-arrangement for frequency-demodulation of an electrical signal comprising a transistor having in succession a first zone of the one conductivity type, a second zone of the other conductivity type and a third zone of the first mentioned conductivity type, an emitter electrode connected to said first zone and two symmetrical base electrodes connected to said second zone, first and second tuned circuits inductively intercoupled and tuned to the central frequency of said electrical signal, a coil inductively coupled to said first tuned circuit and connected at one end to the midpoint of said second tuned circuit, said second tuned circuit being connected between said two base electrodes, an impedance connected between said two base electrodes, an impedance connected between the other end of said coil and said emitter electrode, means coupled to the other end of said coil for applying a direct voltage to said third zone, and a smoothing filter connected between said two base electrodes, the signals from said coil and from said second tuned circuit having a relative phase difference varying with the frequency of said electrical signal at which the potential difference between said two base electrodes is a measure of said frequency.

9. A circuit-arrangement for frequency-demodulation of an electrical signal comprising a transistor having a zone of the one conductivity type and three separate zones of the other conductivity type, an emitter electrode connected to one of said separate zones, two symmetrical base electrodes connected to said first mentioned zone, and two collector electrodes connected respectively to the remaining of said separate zones, first and second tuned circuits inductively intercoupled and tuned to the central frequency of said electrical signal, a coil inductively coupled to said first tuned circuit and connected at one end to the midpoint of said second tuned circuit, said second tuned circuit being connected between said two base electrodes, an impedance connected between the other end of said coil and said emitter electrode, means coupled to the other end of said coil for applying a direct voltage to each of said collector electrodes, and a smoothing filter connected between said two collector electrodes.

10. A circuit-arrangement for intermodulating two electrical signals comprising a transistor having in succession a first $p$ conductivity type zone, a first $n$ conductivity type zone, a second $p$ conductivity type zone, a second $n$ conductivity type zone and a third $p$ conductivity type zone, an emission electrode connected to said first $p$ zone, a first base electrode connected to said first $n$ zone, a second base electrode connected to said second $n$ zone and a collector electrode connected to said third $p$ zone, a transformer having a primary winding and a secondary winding having a tap thereon, a first signal source connected between said tap and said first base electrode, a second signal source connected across said primary winding, said secondary winding being connected between said emission electrode and said second base electrode, a direct voltage source, and an output impedance connected in series with said direct voltage source between said collector electrode and said first base electrode, the amplitude of the signal of said second source relative to the signal of said first source having a ratio value at which the current from said second source which passes through said first source is approximately zero.

References Cited in the file of this patent

UNITED STATES PATENTS

| | | |
|---|---|---|
| 2,462,849 | Dishal et al. | Mar. 1, 1949 |
| 2,476,323 | Rack | July 19, 1949 |
| 2,569,347 | Shockley | Sept. 25, 1951 |
| 2,600,500 | Haynes et al. | June 17, 1952 |
| 2,657,360 | Wallace | Oct. 27, 1953 |